3,316,281
4α,8,14 - TRIMETHYL - 18 - NOR - 5α,8α,9β,14β - AN-
DROST - 1 - EN - 3,11,17 - TRIONE AND DERIVA-
TIVES THEREOF
Patrick A. Diassi, Westfield, and Pacifico A. Principe,
South River, N.J., assignors, by mesne assignments, to
E. R. Squibb & Sons, Inc., New York, N.Y., a corpora-
tion of Delaware
No Drawing. Filed Mar. 23, 1965, Ser. No. 442,203
3 Claims. (Cl. 260—397.3)

This invention relates to and has for its object the pro-
vision of new physiologically active compounds, and more
particularly, compounds selected from the group consist-
ing of 4α,8,14-trimethyl - 18 - nor-5α,8α,9β,14β-androst-1-
en-3,11,17-trione and 4α,8,14-trimethyl-17-hydroxy-18-
nor 5α,8α,9β,14β-androstane-3,11-dione.

The novel compounds of this invention are pharma-
cologically active substances and are particularly useful
as anti-androgenic, anti-estrogenic and anti-gonadotrophic
agents.

The compounds may be formulated for such adminis-
tration, the concentration and/or dosage being based on
the activity of the particular compound and the require-
ments of the patient.

The final products of this invention are prepared by
the process of this invention which entails utilizing 4α,8,
14-trimethyl - 18 - nor - 5α,8α,9β,14β-androstane-3,11,17-
trione as the starting reactant. This compound may be
prepared by refluxing 4α,8,14-trimethyl-16β-hydroxy-18-
nor-5α,8α,9β,13α,14β-androstane-3,11,17-trione 16-acetate
in the presence of glacial acetic acid and zinc dust.

It has been found that the compounds of this invention
can be prepared from the starting reactant by subjecting
the latter to the action of a microorganism of the genus
Fusarium or to the action of the enzymes thereof under
oxidizing and preferably aerobic conditions.

To prepare the compounds of this invention, 4α,8,14-
trimethyl - 18 - nor - 5α,8α,9β,14β - androstane-3,11,17-
trione may be first subjected to the action of enzymes of
a microorganism of the genus Fusarium under oxidizing
conditions. This oxidation can best be effected either by
including the starting reactant in an aerobic culture of
the microorganism, or by bringing together in an aque-
ous medium, the compounds, air, and enzymes of non-
proliferating cells of the microorganism.

In general, the conditions of culturing the Fusarium
microorganism for the purposes of this invention are (ex-
cept for the inclusion of the starting material to be con-
verted), the same as those of culturing various other
microorganisms for the production of antibiotics, vitamin
B-12, and other like substances. The microorganism is
grown aerobically in contact with (in or on) suitable
fermentation medium. A suitable medium essentially
comprises a source of carbon and energy. The latter
may be a carbohydrate, for example, molasses, glucose,
maltose, starch or dextrin, a fatty acid, a fat and/or the
compound itself. Preferably, however, the medium in-
cludes an assimilable source of carbon and energy in addi-
tion to the steroid. Among the fats utilizable for the
purpose of this invention are lard oil, soybean oil, linseed
oil, cottonseed oil, peanut oil, coconut oil, corn oil, castor
oil, sesame oil, crude palm oil, fancy mutton tallow,
sperm oil, olive oil, tristearin, tripalmitin, triolein and tri-
laurin. Among the fatty acids utilizable for the purpose
of this invention are stearic acid, palmitic acid, oleic acid,
linoleic acid and myristic acid.

The source of nitrogenous factors utilizable for the
purposes of this invention may be organic (e.g., soybean
meal, cornsteep liquor, yeast extract, meat extract and/or
distillers' solubles) or synthetic (i.e., composes of simple,
synthesizable organic or inorganic compounds, such as
ammonium salts, alkali nitrates, amino acids or urea).

An adequate sterile air supply should be maintained
during fermentation, for example, by the conventional
methods of exposing a large surface of the medium to air
or by utilizing submerged aerated culture. The com-
pound may be added to the culture during the incubation
period, or included in the medium prior to sterilization
or inoculation. The preferred (but not limiting) range
of the concentration of the compound in the culture is
about 0.01% to about 0.1%. The culture period (or
rather the time of subjecting the compound to the action
of the enzyme) may vary considerably, the range of about
twenty-four to ninety-six hours being feasible, but not
limiting.

The microbial process described hereinabove yields the
4α,8,14 - trimethyl - 18 - nor - 5α,8α,9β,14β-androst-1-en-
3,11,17-trione and additionally upon further processing,
there is obtained 4α,8,14-trimethyl-17-hydroxy-18-nor-5α,
8α,9β,14β-androstane-3,11-dione.

The invention may be illustrated by the following ex-
amples, all temperatures are in degrees centigrade unless
otherwise stated.

EXAMPLE 1

*4α,8,14-trimethyl-18-nor-5α,8α,9β,14β-
androstane-3,11,17-trione*

To a solution of 100 mg. of 4α,8,14-trimethyl-16β-hy-
droxy-18 - nor - 5α,8α,9β,13α,14β - androstane - 3,11,17-
trione 16-acetate in 10 ml. of glacial acetic acid 200 mg.
of zinc dust are added and the mixture refluxed with stir-
ring for three hours. The mixture is filtered and washed
with acetic acid. The combined filtrate and washings are
then diluted with water and extracted with chloroform.
The chloroform is washed with water, evaporated and the
residue crystallized from acetone-hexane to give 55 mg.
of 4α,8,14-trimethyl-18-nor-5α,8α,9β,14β-androstane-3,11,
17-trione having a melting point about 170–172° C.

EXAMPLE 2

*4α,8,14 - trimethyl - 18 - nor - 5α,8α,9β,14β - androst - 1-
en - 3,11,17 - trione and 4α,8,14 - trimethyl - 17 - hy-
hydroxy-18-nor-5α,8α,9β,14β-androstane-3-11-dione*

Surface growth from each of 2 two-week old agar
slants of *Fusarium javanicum* var. *ensiforme* (QM–524)
(Army Quartermaster, Natick, Mass.), the slants contain-
ing as a nutrient medium (A):

| | Grams |
|---|---|
| Glucose | 10 |
| Yeast extract | 2.5 |
| K₂HPO₄ | 1 |
| Agar | 20 |
| Distilled Water to 1 liter. | | is suspended in 5 ml. of 0.1% aqueous sodium lauryl sul-
fated solution. One ml. portion of this suspension are
used to inoculate eight 250 ml. Erlenmeyer flasks, each
containing 50 ml. of the following sterilized medium (B):

| | Grams |
|---|---|
| Dextrose | 10 |
| Cornsteep liquor | 6 |
| NH₄H₂PO₄ | 3 |
| Yeast extract | 2.5 |
| CaCO₃ | 2.5 |
| Distilled Water to 1 liter. | |

After 24 hours incubation at 25° with continuous
rotary agitation (280 cycles/minute; two inch radius),
10% (v.:v.) transfers are made to forty 250 ml. Erlen-
meyer flasks, each containing 50 ml. of freshly sterilized
medium B. After 18 hours of further incubation, using
the same conditions described above, each flask is supemented with 300 micrograms/ml. of 4a,8,14-trimethyl - 18-nor - 5α,8α,9β, 14β - androstane - 3,11,17-ione. The steriod is added by supplementing each flask with 0.25 ml. of a sterile solution of the steroid in N,N-methylformamide containing 60 mg./ml. of steroid. A total of 600 mg. is fermented. After 7 days of further incubation, using the same conditions as described above, the contents of the flasks are pooled and filtered through a Seitz clarifying pad. The flasks, mycelium and pad are washed with successive 50 ml. portions of warm water. The combined filtrate and washings have a volume of 2500 ml. They are extracted three times with 800 ml. portions of chloroform which are combined, washed twice with 1 liter portions of water and evaporated, in vacuo. The residue is plate chromatographed on Woelm neutral alumina (activity V) using chloroform as the developing solvent. The band detectable by UV at $Rf \approx 0.5$ is eluted with ethyl acetate, evaporated and crystallized from acetone-hexane to give 12 mg. of 4α,8,14 - trimethyl - 18 - nor - 5α,8α,9β,14β-androst-1-en-3,11,17-trione having a melting point about 205–207° C., $[\alpha]_D^{22}$ −37° (chloroform), $\lambda_{max.}^{alc.}$ 249 mμ (ε, 10, 270)

*Analysis.*—Calcd. for $C_{21}H_{28}O_3$ (328.46): C, 76.79; H, 8.59. Found: C, 76.70; H, 8.51.

A band detectable with iodine at $Rf \approx 0.8$ is eluted with ethyl acetate, evaporated and crystallized from acetone-hexane to give 89 mg. of 4α,8,14-trimethyl-17-hydroxy-18 - nor - 5α,8α,9β,14β-androstane - 3,11 - dione having a melting point about 213–215 C., $[\alpha]_D^{22}$ +37° (chloroform).

*Analysis.*—Calcd. for $C_{21}H_{32}O_3$ (332.49): C, 75.86; H, 9.70. Found: C, 75.70; H, 9.84.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:
1. A compound selected from the group consisting of 4α,8,14 - trimethyl - 18 - nor - 5α,8α,9β,14β - androst - 1-en-3,11,17 - trione and 4α,8,14 - trimethyl - 17 - hydroxy-18 - nor - 5α,8α,9β,14β - androstane - 3,11 - dione.
2. 4α,8,14-trimethyl - 18 - nor - 5α,8α,9β,14β-androst-1-en-3,11,17-trione.
3. 4α,8,14 - trimethyl - 17 - hydroxy - 18 - nor - 5α,8α, 9β,14β-androstane-3,11-dione.

No references cited.

ELBERT L. ROBERTS, *Acting Primary Examiner.*